United States Patent
Adhikary et al.

(10) Patent No.: US 9,942,026 B2
(45) Date of Patent: Apr. 10, 2018

(54) FREQUENCY OFFSET CORRECTION IN NARROWBAND MACHINE-TO-MACHINE

(71) Applicant: TELEFONAKTIEBOLAGET LM ERICSSON (PUBL), Stockholm (SE)

(72) Inventors: Ansuman Adhikary, Santa Clara, CA (US); Niklas Johansson, Uppsala (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/004,275

(22) Filed: Jan. 22, 2016

(65) Prior Publication Data

US 2016/0218856 A1     Jul. 28, 2016

Related U.S. Application Data

(60) Provisional application No. 62/108,351, filed on Jan. 27, 2015.

(51) Int. Cl.
*H04L 7/00*     (2006.01)
*H04W 4/06*     (2009.01)
(Continued)

(52) U.S. Cl.
CPC ........ *H04L 7/0037* (2013.01); *H04L 27/0014* (2013.01); *H04L 27/2657* (2013.01);
(Continued)

(58) Field of Classification Search
CPC .......................... H04L 7/0331; H04L 27/2644
See application file for complete search history.

(56) References Cited

U.S. PATENT DOCUMENTS

| 6,728,326 B1 * | 4/2004 | Fulghum | H04L 7/04 370/514 |
| 7,139,333 B2 * | 11/2006 | Tanada | H04L 7/042 375/316 |

(Continued)

FOREIGN PATENT DOCUMENTS

| EP | 1278345 A1 | 1/2003 |
| WO | 2008117980 A1 | 10/2008 |

OTHER PUBLICATIONS

NB M2M—Overview of the Physical Layer Design. 3GPP TSG GERAN #63 GP-140563. Ljubljana, Slovenia Agenda Item: 7.1.5.3.5. Source: Huawei Technologies Co., Ltd., HiSilicon Technologies Co., Ltd. Aug. 25-Aug. 29, 2014.*

(Continued)

*Primary Examiner* — Ross Varndell

(57) ABSTRACT

A method in a node is disclosed. The method comprises receiving a signal, and obtaining a first oversampled received signal by sampling the received signal according to a symbol rate. The method further comprises estimating a first frequency offset based on the first oversampled received signal, the first frequency offset estimated using an estimation range limited to one of a bandwidth of the received signal or the symbol rate of the received signal, and obtaining a second oversampled received signal by sampling the received signal according to N times the symbol rate, wherein N is greater than 1. The method further comprises estimating a true frequency offset based on the first frequency offset estimate and the second oversampled received signal.

16 Claims, 11 Drawing Sheets

(51) Int. Cl.
  *H04W 4/00* (2009.01)
  *H04L 27/00* (2006.01)
  *H04L 27/26* (2006.01)
(52) U.S. Cl.
  CPC ............. *H04W 4/005* (2013.01); *H04W 4/06* (2013.01); *H04L 2027/0034* (2013.01); *H04L 2027/0095* (2013.01)

(56) References Cited

U.S. PATENT DOCUMENTS

| 2011/0182387 A1* | 7/2011 | Ahmed ............... H04L 27/0014 375/344 |
| 2011/0223901 A1 | 9/2011 | Swarts |
| 2013/0216005 A1* | 8/2013 | Chaudhary ......... H04L 27/0014 375/324 |
| 2014/0179254 A1* | 6/2014 | Lai ..................... H04L 27/0014 455/326 |
| 2016/0218821 A1* | 7/2016 | Adhikary ............ H04J 11/0069 |

OTHER PUBLICATIONS

Meyr H et al: "Digital Communication Receivers, Chapter 5 (Synthesis of Synchronization Algorithms. Chapter 8 (Frequency Estimation)" Jan. 1, 1998 (Jan. 1, 1998), Digital Communication Receivers: Synchronization, Channel Estimation, and Signal Processing; [Wiley Series in Telecommunications and Signal Processing], John Wiley and Sons, Inc, New York, NY [U.A.], pp. 271-323,445, XP002547568, ISBN: 978-0-471-50275-3. Sect.s 8.1, 8.2.
NB M2M—Cell Search Mechanism. 3GPP GERAN #64 GP-140864. San Francisco, USA Agenda Item: 7.1.5.3.5. Source: Huawei Technologies Co., Ltd., HiSilicon Technologies Co., Ltd. Nov. 17-21, 2014.
NB M2M—Frame Index Indication Design. 3GPP GERAN #64 GP-140861. San Francisco, USA Agenda Item: 7.1.5.3.5. Source: Huawei Technologies Co., Ltd., HiSilicon Technologies Co., Ltd. Nov. 17-21, 2014.
Vodafone. New Study Item on Cellular System Support for Ultra Low Complexity and Low Throughput Internet of Things. 3GPP TSG-GERAN Meeting #62 GP-140421. Valencia, Spain, rev of GP-140418 rev of GP-140411. May 26-30, 2014.

* cited by examiner

FREQUENCY OFFSET CORRECTION IN NARROWBAND MACHINE-TO-MACHINE

PRIORITY

This application claims the benefit under 35 U.S.C. § 119(e) of the priority of U.S. Provisional Application 62/108,351 filed on Jan. 27, 2015, entitled "Frequency Offset Correction in NB M2M," the entire disclosure of which is hereby incorporated by reference.

TECHNICAL FIELD

The present disclosure relates, in general, to wireless communications and, more particularly, to frequency offset correction in narrowband machine-to-machine communications.

BACKGROUND

Cellular communication systems are being developed and improved for machine type communication (MTC), communication characterized by lower demands on data rates than for example mobile broadband, but with higher requirements on, for example, low cost device design, better coverage, and an ability to operate for years on batteries without charging or replacing the batteries. In the 3GPP GERAN specification group, cellular communication systems are being improved and developed in the feasibility study named "Cellular System Support for Ultra Low Complexity and Low Throughput Internet of Things." GSM is being evolved, and new "clean slate" systems (systems not based on current cellular systems) are being developed.

One "clean slate" solution, called narrowband machine-to-machine (NB M2M), is a narrowband system with a carrier bandwidth of 200 kHz that targets improved coverage compared to GSM systems, long battery life, and low complexity communication design. One intention with this solution is to deploy it in spectrum that is currently used for GSM, by reducing the bandwidth used by GSM and deploying NB M2M in the spectrum that becomes available. Another intention is to reuse existing GSM sites for the deployment of NB M2M.

In cellular communication systems, devices use a cell search procedure (or synchronization procedure) to understand which cell(s) to connect to. Some of the functions of a cell search procedure include detecting a suitable cell to camp on, and for that cell, obtaining the symbol and frame timing and synchronizing to the carrier frequency. When synchronizing to the carrier frequency, the mobile station needs to correct any erroneous frequency offsets that are present, and perform symbol timing alignment with the frame structure from the base station.

When the device wakes up from deep sleep, for example from being in a power saving state, the frequency offset is to a large extent due to device clock inaccuracy (often assumed to be up to 20 ppm). The clock inaccuracy appears mainly as a frequency offset of the received signal, a continuous rotation of the received samples. For a system operating with a carrier frequency of 900 MHz, the maximum frequency offset is 18 kHz (corresponding to 20 ppm inaccuracy). This offset needs to be estimated and corrected for.

The cell search procedure for NB M2M is described in GP-140864, "NB M2M—Cell Search Mechanism," and GP-140861, "NB M2M—Frame Index Indication Design." A physical channel named Physical Broadcast Synchronization Channel (PBSCH) is dedicated to carrying the synchronization signals, along with the broadcast system information. A separate downlink physical channel per base station is reserved for PBSCH, while the data channels are multiplexed by frequency division multiplexing (FDM). In addition, the PBSCH operates with a reuse factor of 1, implying that the PBSCH of neighboring cells are completely overlapped in the frequency domain. This has the advantage of a reduction in search complexity, but also results in interference from all the other cells using the PBSCH. As described in GP-140864, frame timing estimation and frequency offset correction is performed using two different sequences:

(a) Primary Synchronization Sequence (PSS): The PSS is used to determine the frame timing alignment, along with a coarse estimation of the frequency offset.

(b) Secondary Synchronization Sequence (SSS): The SSS is used to obtain a finer estimate of the frequency offset.

FIG. 1 illustrates a frame structure for PBSCH. More particularly, FIG. 1 illustrates a number of frames 5a, 5b, 5c, 5d (corresponding to the 0th Frame, 1st Frame, 2nd Frame, and 63rd Frame, respectively). Every frame, such as 2nd Frame 5c, consists of 960 symbols. In the example frame structure shown in FIG. 1, 2nd Frame 5c includes PSS 10, SSS 15, and Frame Index Indication Sequence (FIIS)+ Broadcast Information Block (BIB) 20. In 2nd Frame 5c, 256 symbols are dedicated to PSS 10, 257 symbols are dedicated for SSS 15, and 447 symbols are dedicated to FIIS+BIB 20 (of the 447 symbols, 127 symbols are dedicated for FIIS, and the remaining 320 symbols are for carrying the broadcast information in a BIB.

After switching on, an MTC device first needs to search for a signal in a viable frequency band. Signal detection is performed on the basis of comparing the amplitude of the peak from a correlation based detector with a pre-determined threshold. This is achieved by correlating the received signal with a known sequence, or a set of known sequences. Timing offset estimation and frequency offset estimation can then be performed as described in GP-140864.

A problem with this approach arises from the fact that the maximum frequency offset can be +/−18 kHz, whereas the signal bandwidth is only 12 kHz. Since the maximum frequency offset is larger than the signal bandwidth, using the existing approach for detecting the frequency offset described in GP-140864 leads to aliasing. With existing frequency offset detectors that have a sampling rate corresponding to the signal bandwidth of 12 kHz, or those that perform linear operations such as correlation of the transmitted signal with the received signal in time or frequency domain, one can only detect frequency offsets in the range [−6,6] kHz, and any frequency offset outside this range will be aliased and incorrectly detected as being in the range [−6,6] kHz.

SUMMARY

To address the foregoing problems, disclosed is a method in a node. The method comprises receiving a signal, and obtaining a first oversampled received signal by sampling the received signal according to a symbol rate. The method further comprises estimating a first frequency offset based on the first oversampled received signal, the first frequency offset estimated using an estimation range limited to one of a bandwidth of the received signal or the symbol rate of the received signal. The method further comprises obtaining a second oversampled received signal by sampling the received signal according to N times the symbol rate, wherein N is greater than 1, and estimating a true frequency offset based on the first frequency offset estimate and the second oversampled received signal.

In certain embodiments, the node may comprise one of a wireless device or a network node. The method may further comprise determining, based on the estimated first frequency offset, a set of possible aliased frequency offsets corresponding to the estimated first frequency offset. The method may further comprise estimating a time offset before estimating the first frequency offset as part of a cell search procedure. The method may further comprise using the estimated true frequency offset to correct the received signal to enable reception of subsequent information. In certain embodiments, the subsequent information may comprise one or more of: a cell identity; a frame number; broadcast information; and a data transmission.

In certain embodiments, estimating the true frequency offset based on the first frequency offset estimate and the second oversampled received signal may comprise correcting the estimated first frequency offset using the second oversampled received signal to extend the estimation range outside of the signal bandwidth of the received signal or the symbol rate of the received signal. In certain embodiments, estimating the true frequency offset based on the first frequency offset estimate and the second oversampled received signal may comprise: generating a plurality of signals, each of the plurality of generated signals comprising a noise-free received signal with a frequency offset applied, the applied frequency offset comprising one of the determined set of possible aliased frequency offsets corresponding to the estimated first frequency offset; comparing one or more of the generated signals to the second oversampled received signal; and determining one of the applied frequency offsets to be the true frequency offset based at least in part on the comparison of one or more of the generated signals to the second oversampled received signal. In certain embodiments, estimating the true frequency offset based on the first frequency offset estimate and the second oversampled received signal may comprise: generating a noise-free received signal without a frequency offset applied; applying an element-wise multiplication of the second oversampled received signal with a complex conjugate of the generated noise-free received signal to generate a new signal; and determining an aliased frequency offset within the determined set of possible aliased frequency offsets to be the true frequency offset, wherein the aliased frequency offset determined to be the true frequency offset is an aliased frequency offset within the determined set of possible aliased frequency offsets that is most similar to the generated new signal.

Also disclosed is a node. The node comprises one or more processors. The one or more processors are configured to receive a signal and obtain a first oversampled received signal by sampling the received signal according to a symbol rate. The one or more processors are further configured to estimate a first frequency offset based on the first oversampled received signal, the first frequency offset estimated using an estimation range limited to one of a bandwidth of the received signal or the symbol rate of the received signal. The one or more processors are further configured to obtain a second oversampled received signal by sampling the received signal according to N times the symbol rate, wherein N is greater than 1, and estimate a true frequency offset based on the first frequency offset estimate and the second oversampled received signal.

Also disclosed is a computer program product. The computer program product comprises instructions stored on non-transient computer-readable media which, when executed by one or more processors, perform the acts of receiving a signal and obtaining a first oversampled received signal by sampling the received signal according to a symbol rate. The instructions, when executed by the one or more processors, perform the acts of estimating a first frequency offset based on the first oversampled received signal, the first frequency offset estimated using an estimation range limited to one of a bandwidth of the received signal or the symbol rate of the received signal, and obtaining a second oversampled received signal by sampling the received signal according to N times the symbol rate, wherein N is greater than 1. The instructions, when executed by the one or more processors, perform the act of estimating a true frequency offset based on the first frequency offset estimate and the second oversampled received signal.

Certain embodiments of the present disclosure may provide one or more technical advantages. As one example, certain embodiments may provide for correction of frequency offsets larger than the signal bandwidth. In certain embodiments, this is achieved by making use of an oversampled received signal to correct the aliasing and allow for detection of the true frequency offset. This may advantageously allow the range of frequency offset detection to be extended from a limited offset range to the full required offset detection range. As another example, certain embodiments may be applicable to any use case where the true frequency offset is larger than the signal bandwidth. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As noted above, a problem with previous approaches arises from the fact that the maximum frequency offset can be larger than the signal bandwidth. In such a case, using existing approaches for detecting the frequency offset leads to aliasing. For example, in some cases the frequency offset can be +/−18 kHz, whereas the signal bandwidth is only 12 kHz. With existing frequency offset detectors that have a sampling rate corresponding to the signal bandwidth of 12 kHz, or those that perform linear operations such as correlation of the transmitted signal with the received signal in time or frequency domain, one can only detect frequency offsets in the range [−6,6] kHz, and any frequency offset outside this range will be aliased and incorrectly detected as being in the range [−6,6] kHz.

The present disclosure contemplates various embodiments that may address these and other deficiencies of existing approaches. In some cases, this is accomplished using a new method to correct the aliasing and detect the true frequency offset. In one example embodiment, a node (such as, for example, a wireless device or a network node) receives a signal. The node obtains a first oversampled received signal by sampling the received signal according to a symbol rate. The node estimates a first frequency offset based on the first oversampled received signal, the first frequency offset estimated using an estimation range limited to one or a bandwidth of the received signal or the symbol rate of the received signal. The first frequency offset estimate lies in a limited offset range. This estimate is corrected for the ambiguity that is due to aliasing.

In some cases, it may be possible to correct the aliasing and detect the true frequency offset by using correlation between the oversampled known transmitted sequence and the oversampled received sequence. Particular embodiments may use the correlation between the oversampled known transmitted sequence and the oversampled received sequence to get the true frequency offset. This may advantageously allow for the range of frequency offset detection to be extended from the first limited offset range, to the full required offset detection range, for example from [−6,6] kHz to [−18,18] kHz. Thus, frequency offsets larger than the signal bandwidth are able to be corrected by making use of the oversampled received signal, and may be applicable to any use case where the true frequency offset is larger than the signal bandwidth.

Figure 1:
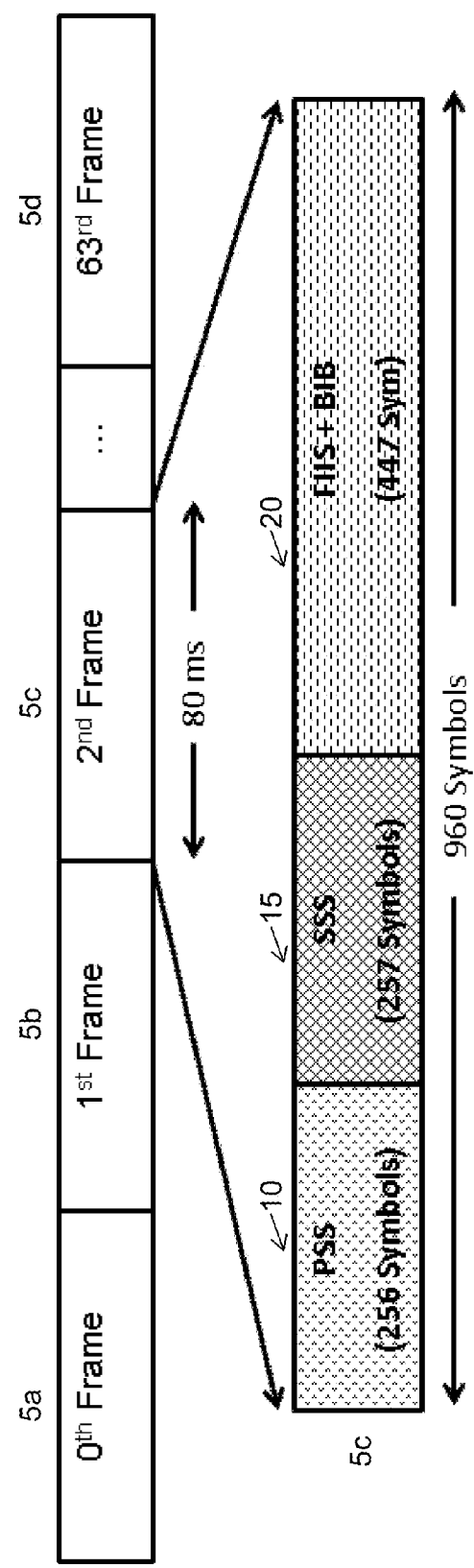
FIG. 1 illustrates a frame structure for PBSCH.
Figure 2:
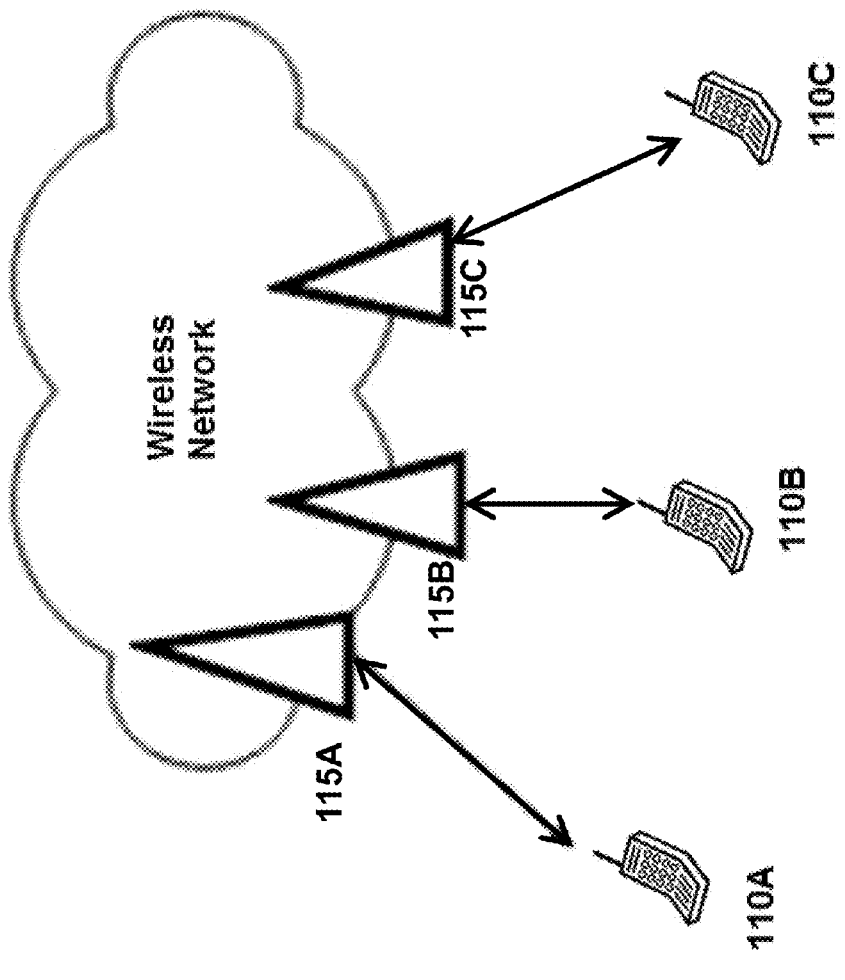
FIG. 2 is a schematic diagram of a wireless communications network, in accordance with certain embodiments.

FIG. 2 is a block diagram illustrating an embodiment of a network 100, in accordance with certain embodiments. Network 100 includes one or more UE(s) 110 (which may be interchangeably referred to as wireless devices 110, MTC UE 110, or MTC device 110), network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine-to-machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on).

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME etc), O&M, OSS, SON, positioning node (e.g., E-SMLC), MDT, or any suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel. The term "node" used herein may be used to denote a UE or a network node.

Example embodiments of UE 110, network nodes 115, and other network nodes (such as radio network controller or core network node) are described in more detail below with respect to FIGS. 6-11.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

In certain embodiments, depending on the scenario, a node, such as wireless device 110, first estimates the frequency offset with an estimation range that is limited to the bandwidth of the signal or the symbol rate of the signal. Then, wireless device 110 applies the technique described herein to extend the range outside of the signal bandwidth, up to the maximum frequency offset range that the receiver needs to handle.

As an example, consider the procedure proposed to be used in NB M2M described in GP-140864. Note, however, that this is only one example, and the present disclosure contemplates that the various embodiments described herein can be applied to other systems where the same problem arises. Similarly, although the following example focuses on wireless device 110, the various embodiments described herein are applicable to any suitable node, such as network node 115, as well as any other suitable device having a receiver and susceptible to potential frequency offsets that are larger than the signal bandwidth.

In certain embodiments, a node, such as wireless device 110 (which may be an MTC device), receives a signal. Wireless device 110 first obtains the frame timing using the PSS (such as PSS 10 described above). Wireless device 110 then uses the SSS (such as SSS 15 described above) for determining the frequency offset. Wireless device 110 may then obtain a first oversampled received signal by sampling the received signal according to a symbol rate. In some embodiments, the received signal may be sampled according to the symbol rate (i.e., oversampling factor 1) to obtain the first oversampled received signal.

When wireless device 110 wakes up from deep sleep, the inaccuracies in the device clocks can give rise to an initial frequency offset. In the NB M2M example, the initial frequency offset may be up to +/−18 kHz (corresponding to 20 ppm for a carrier frequency of 900 MHz). A first frequency offset estimation based on the first oversampled received signal, for example as described in GP-140864, is determined as a potential frequency offset. However, since the signal bandwidth is only 12 kHz, the frequency offset detection is limited to the range +/−6 kHz. Frequency offsets outside +/−6 kHz are aliased and appear as offsets within the range +/−6 kHz. For example, a frequency offset of 15 kHz appears as an offset of 3 kHz. In order to resolve this detection range problem, certain embodiments use the correlation between the oversampled received signal and the known oversampled transmitted signal to correct such ambiguities. This may be applied to all scenarios where the actual frequency offset to be detected is larger than the signal bandwidth or symbol rate, and is not limited to offset methods disclosed in GP-140864.

As described above, when the actual frequency offset is larger than the symbol bandwidth, previous approaches provide an aliased value of the true frequency offset. Wireless device 110 corrects this ambiguity by estimating a true frequency offset based on the first frequency offset estimate and a second oversampled received signal. In certain embodiments, the second oversampled received signal is obtained by sampling the received signal according to N times the symbol rate, where N is greater than 1 (i.e., oversampling factor N).

In some embodiments, estimating a true frequency offset based on the first frequency offset estimate and the second oversampled received signal may comprise generating decision metrics, each associated with a frequency offset in a set of possible aliased frequency offsets, which is determined by the first frequency offset estimate. For example, wireless device 110 may determine, based on the estimated first frequency offset, a set of possible aliased frequency offsets corresponding to the estimated first frequency offset.

In certain embodiments, to estimate a true frequency offset based on the first frequency offset estimate and a second oversampled received signal wireless device 110 may correct the first frequency offset estimate by using the second oversampled received signal. As described above, the first frequency offset estimate lies in a (too) limited frequency offset range. The true frequency offset may be estimated in any suitable manner. As one example, wireless device 110 may generate a plurality of signals, each of the plurality of signals corresponding to a noise-free received signal with a certain frequency offset applied. In some cases, each potential frequency offset may be the first frequency offset estimate, adjusted with an additional offset corresponding to the aliasing that may have happened when forming the first frequency offset estimate. Then, each generated signal is compared with the second oversampled received signal to determine which potential frequency offset gives the best match.

As another example, wireless device 110 may generate a noise-free received signal without a frequency offset applied. Wireless device 110 may then apply an element-wise multiplication of the second oversampled received signal with a complex conjugate of the generated noise-free received signal to generate a new signal. The resulting new signal may be investigated to determine an aliased frequency offset within the determined set of possible aliased frequency offsets that is the true frequency offset. In some cases, the aliased frequency offset determined to be the true frequency offset is an aliased frequency offset within the determined set of possible aliased frequency offsets that is most similar to the generated new signal.

In particular embodiments, wireless device 110 may also perform the dot-product of the resulting new signal with a number of frequency offset phasors, where each phasor corresponds to a potential frequency offset. Each potential frequency offset is the first frequency offset estimate, adjusted with an additional offset corresponding to the aliasing that may have happened when forming the first estimate. Then each generated signal is compared with the received signal, to determine which potential frequency offset gives the best match.

The present disclosure contemplates that any of the embodiments described herein may be used in a cell search procedure where a time offset estimation has been performed before the frequency offset estimation is performed. Similarly, any of the embodiments described herein may be used in a cell search procedure, where the resulting frequency offset estimate is used to correct the received signal for reception of subsequent information. For example, the subsequent information may include the reception of the frame number, the reception of the cell identity, the reception of the cell identity, followed by the reception of the frame number, the reception of broadcast information, the reception of data transmission, etc.

Figure 3:
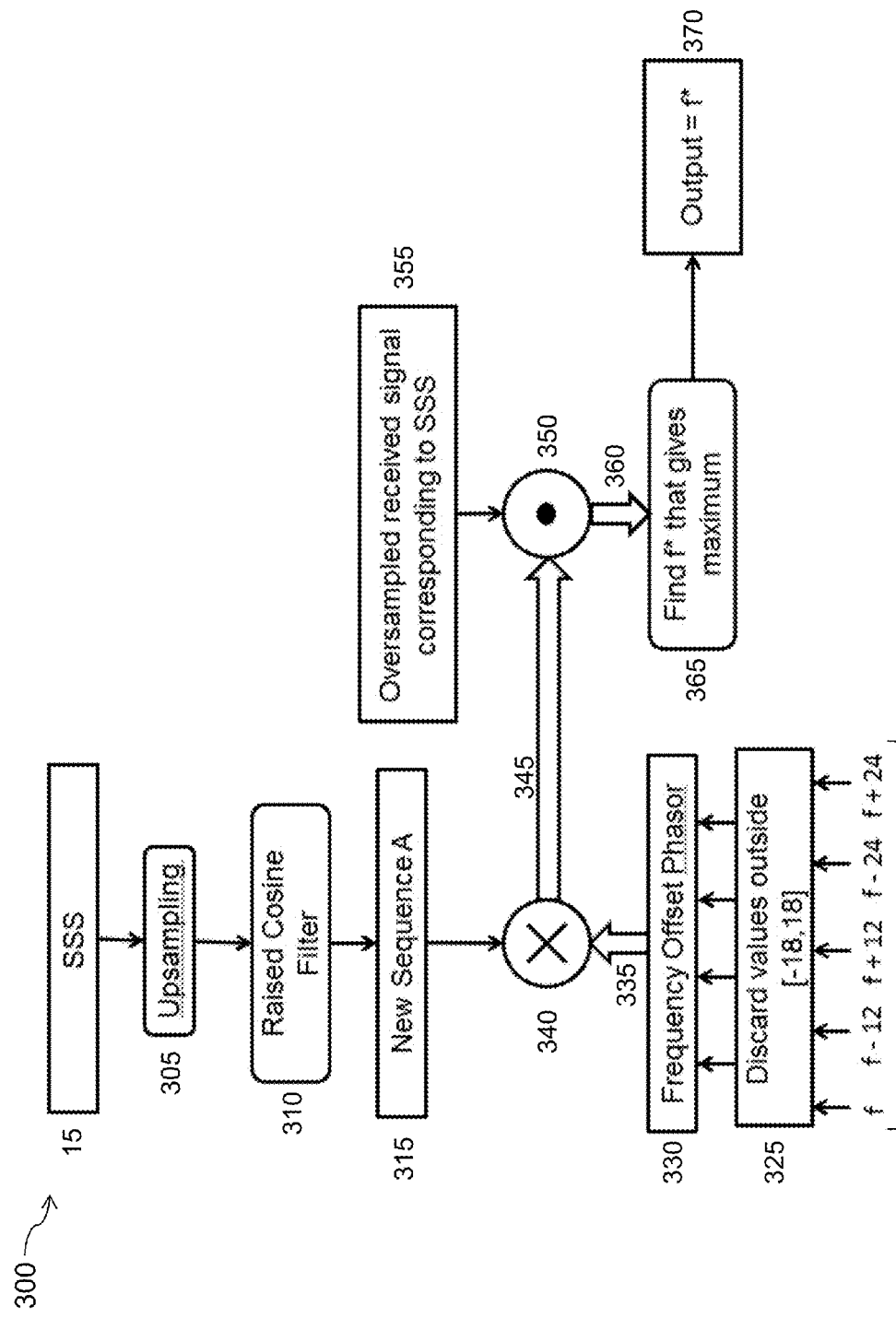
FIG. 3 illustrates a method in a receiver for correction of aliased frequency offsets, in accordance with certain embodiments.

FIG. 3 illustrates a method 300 in a receiver for correction of aliased frequency offsets, in accordance with certain embodiments. The receiver may be included in a wireless device or network node, such as wireless device 110 or network node 116 described above, or in any other suitable device. At block 305, SSS 15 is up-sampled. At block 310, up-sampled SSS 15 is passed through a filter corresponding to the transmit filter in the transmitter and the receive filter in the receiver. Although FIG. 3 illustrates an example in which the filter corresponding to the transmit filter in the transmitter and the receive filter in the receiver together can be seen as a raised cosine filter, the present disclosure contemplates that any suitable filter may be used. As a result, New Sequence A is obtained at block 315. New sequence A at block 315 corresponds to what would be the oversampled received SSS in absence of noise in a frequency-flat non-fading channel.

As noted above, when an MTC device 110 wakes up from deep sleep, the inaccuracies in the device clocks can give rise to an initial frequency offset (up to +/−18 kHz in NB M2M, for example). A first frequency offset estimation, such as one determined in accordance with GP-140864, is determined as a potential frequency offset. The estimated frequency offset obtained from the first basic frequency offset estimation, such as the one in GP-140864, can be denoted as f. A set of possible aliased frequency offsets 320 corresponding to f is formed as follows:

$$F=\{f, f-12, f+12, f-24, f+24\} \text{ kHz}. \tag{1}$$

A smaller or larger set can also be envisioned, with equal and non-equal spacing of the offsets.

Since the maximum frequency offset in this example is +/−18 kHz, any value in the set F outside the range [−18,18] kHz is discarded at block 325. At block 330, the remaining values from the set are input to a frequency offset phasor, which is a vector of the same length as SSS 15 and is of the form:

$$\left[1, e^{j\frac{2\pi f}{SB}}, e^{j\frac{4\pi f}{SB}}, \ldots, e^{j\frac{2(NS-1)\pi f}{SB}}\right], f \in F \tag{2}$$

Here, N is the length of the (non-oversampled) SSS 15 in number of symbols. S is the oversampling factor (i.e., the number of samples per symbol). B is the bandwidth in kHz.

The thick arrows (arrow 335, 345, and 360) illustrated in FIG. 3 indicate that multiple such vectors are formed, each corresponding to a value in the set of possible aliased frequency offsets 320 (denoted as F in Equation 1 above). At block 340, an element-wise multiplication is performed on the up-sampled and interpolated SSS 15 with each of the frequency offset phasors generated at block 330. The resulting signals 345 are fed as input to block 350, which calculates the dot product between each of the signals 345 and oversampled received signal 355 (the part corresponding to SSS 15, which is known after frame timing). The number of values obtained 360 is equal to the number of elements in F (the set of possible aliased frequency offsets 320). At block 365, the frequency offset corresponding to the maximum of these values is determined as the true frequency offset and final frequency offset estimate. At block 370, the final frequency offset is output.

In certain embodiments, not the full length of the signal but only a part of the transmitted and received signal corresponding to the sequence (here, SSS 15) is used to determine the frequency offset according to the above description. As one example, this part of the transmitted and received signal may consist of all samples of the signal, but over a length that is shorter than the full frequency offset estimation signal. As another example, the part of the transmitted and received signal can be all oversampled samples except the ones corresponding to the non-oversampled symbol positions, since these positions would give the same contribution to the dot product independent of the potential offset f in the set of possible aliased frequency offsets 320 (F).

Figure 4:
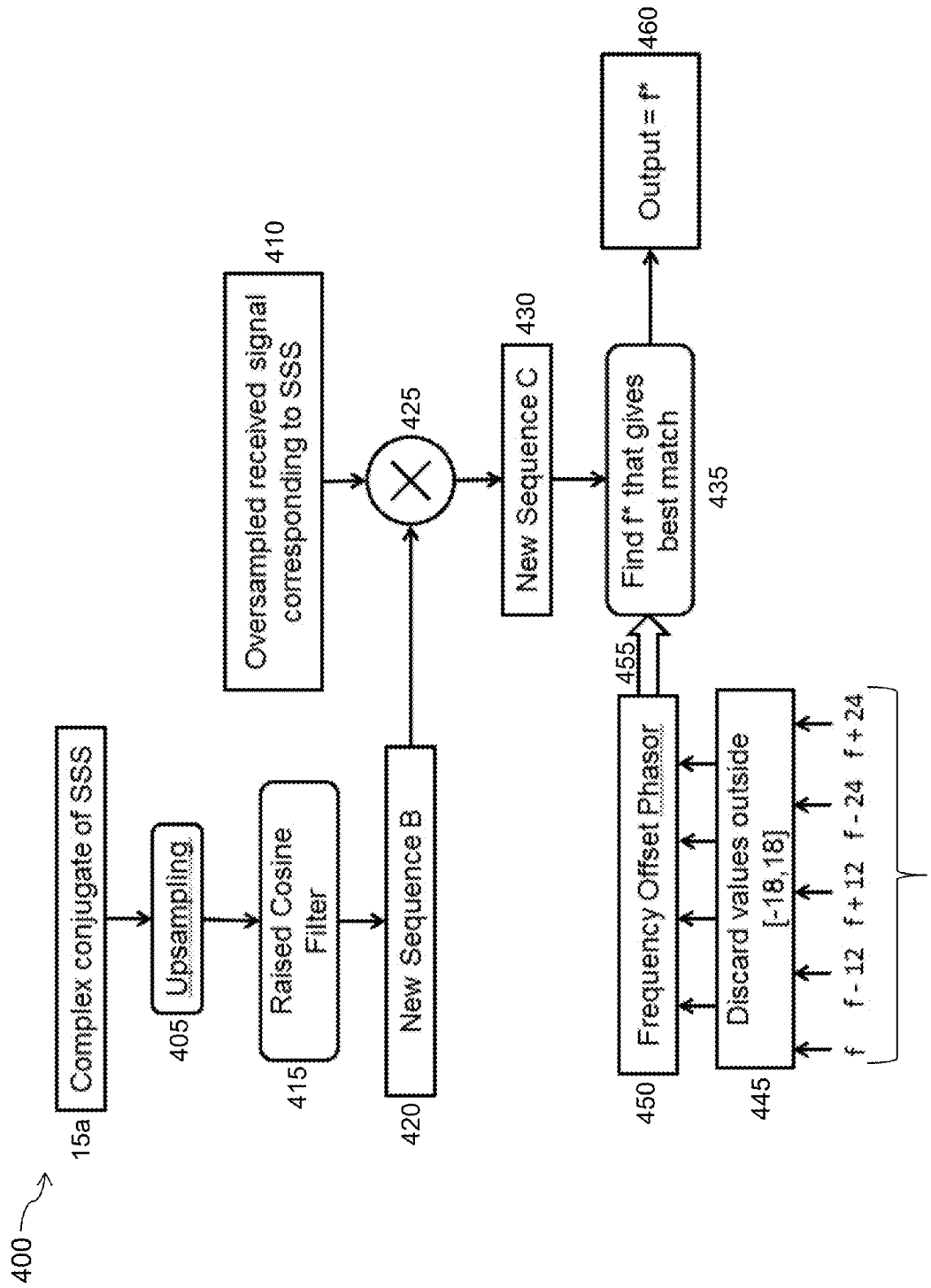
FIG. 4 illustrates an alternative method in a receiver for correction of aliased frequency offsets, in accordance with certain embodiments.

FIG. 4 illustrates an alternative method in a receiver for correction of aliased frequency offsets, in accordance with certain embodiments. In the example illustrated in FIG. 4, the complex conjugate of the transmitted signal used for frequency offset estimation (here, SSS 15a) is up-sampled at block 405 to correspond to the sampling rate of the oversampled received signal 410. At block 415, the up-sampled complex conjugate of the transmitted signal used for frequency offset estimation is filtered with a filter corresponding to the transmit and receive filters (e.g., a raised cosine filter). This way, New Sequence B (corresponding to the complex conjugate of the oversampled transmitted signal) is generated at block 420. At block 425, New Sequence B generated at block 420 is element-wise multiplied with oversampled received signal corresponding to SSS 410. This results in New Sequence C at block 430. At block 435, New Sequence C generated at block 430 is investigated to find the frequency offset that has the best match. In this investigation, the extra samples available in the oversampled New Sequence C are used to determine the correct frequency offset in a wider range of potential offsets.

In the example illustrated in FIG. 4, the investigation at block 435 utilizes the results of the application of a first frequency offset estimation, for example the one described in GP-140864, to find a potential frequency offset. The estimated frequency offset obtained from the first basic frequency offset estimation, such as the one in GP-140864, can be denoted as f. A set of possible aliased frequency offsets 440 corresponding to f is formed as follows:

$$F=\{f, f-12, f+12, f-24, f+24\} \text{ kHz}. \tag{3}$$

A smaller or larger set can also be envisioned, with equal and non-equal spacing of the offsets.

Using the existing NB M2M approach as an example, the maximum frequency offset is +/−18 kHz. Thus, any value in the set F outside the range [−18,18] kHz is discarded at block

445. At block 450, the remaining values from the set are input to a frequency offset phasor. Arrow 455 indicates that multiple such vectors are formed, each corresponding to a value in the set of possible aliased frequency offsets 440 (denoted as F in Equation 3 above).

To find the frequency offset that gives the best match at block 435, one possibility is to calculate the dot-product of the New Sequence C 430 and each possible phasor 455 generated at block 450 (corresponding to each possible f in the set F). An alternative is to create a sub-sequence of length S samples from New Sequence C 430. The sub-sequence can be one part of New Sequence C 430, or it can be a combination of multiple parts of New Sequence C 430. In some embodiments, New Sequence C 430 is split into a number of successive sub-sequences of S samples. Then, the sub-sequences may each be multiplied with a complex number. The complex number may be the complex conjugate of a unit amplitude complex number with the same phase as the first sample in each sub-sequence. Then, one or more sub-sequences are added together. The result of the sum of sub-sequences is a sub-sequence of S samples. The samples of this sub-sequence are then investigated at block 435 to determine the frequency offset that provides the best match. One way is to compare the resulting sub-sequence to a set of S-length phasors, corresponding to the set of candidate frequency offsets:

$$[1, e^{j\frac{2\pi f}{S B}}, e^{j\frac{4\pi f}{S B}}, \ldots, e^{j\frac{2(S-1)\pi f}{S B}}] \quad (5)$$

In some embodiments, the first sample is excluded from the comparison since it is already adjusted to have value 1. In some embodiments, a small subset of the S samples, or only 1 sample, of the sub-sequence is used to determine which of the potential frequency offsets has the best match. This can be done by comparing the samples to the corresponding values of a phasor configured for the frequency offset f.

With either alternative, the frequency offset having the best match found as a result of the investigation at block 435 is determined as the true frequency offset and final frequency offset estimate. At block 460, the final frequency offset is output.

Figure 5:
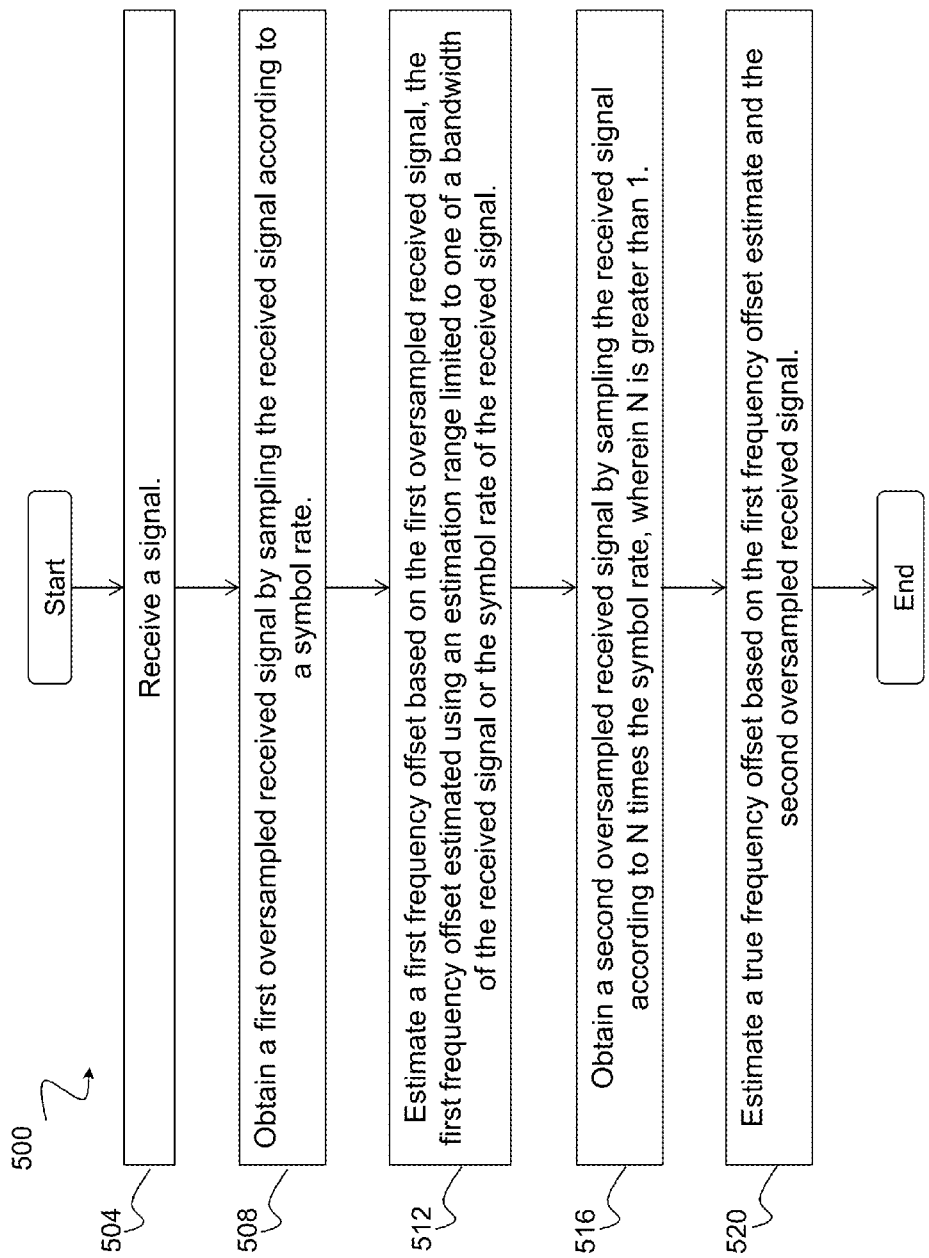
FIG. 5 is a flow diagram of a method in a node, in accordance with certain embodiments.

FIG. 5 is a flow diagram of a method 500 in a node, in accordance with certain embodiments. The method begins at step 504, where the node receives a signal. In certain embodiments, the node may be one of a wireless device or a network node.

At step 508, the node obtains a first oversampled received signal by sampling the received signal according to a symbol rate. At step 512, the node estimates a first frequency offset based on the first oversampled received signal, the first frequency offset estimated using an estimation range limited to one of a bandwidth of the received signal or the symbol rate of the received signal.

At step 516, the node obtains a second oversampled received signal by sampling the received signal according to N times the symbol rate, wherein N is greater than 1.

At step 520, the node estimates a true frequency offset based on the first frequency offset estimate and the second oversampled received signal. In certain embodiments, estimating the true frequency offset based on the first frequency offset estimate and the second oversampled received signal may comprise correcting the estimated first frequency offset using the second oversampled received signal to extend the estimation range outside of the signal bandwidth of the received signal or the symbol rate of the received signal.

In certain embodiments, the method may further comprise determining, based on the estimated first frequency offset, a set of possible aliased frequency offsets corresponding to the estimated first frequency offset. The method may further comprise estimating a time offset before estimating the first frequency offset as part of a cell search procedure. The method may further comprise using the estimated true frequency offset to correct the received signal to enable reception of subsequent information. In certain embodiments, the subsequent information may comprise one or more of: a cell identity; a frame number; broadcast information; and data transmission.

The true frequency offset estimated based on the first frequency offset estimate and the second oversampled received signal may be estimated in any suitable manner. As one example, estimating the true frequency offset based on the first frequency offset estimate and the second oversampled received signal may comprise: generating a plurality of signals, each of the plurality of generated signals comprising a noise-free received signal with a frequency offset applied, the applied frequency offset comprising one of the determined set of possible aliased frequency offsets corresponding to the estimated first frequency offset; comparing one or more of the generated signals to the second oversampled received signal; and determining one of the applied frequency offsets to be the true frequency offset based at least in part on the comparison of one or more of the generated signals to the second oversampled received signal.

As another example, estimating the true frequency offset based on the first frequency offset estimate and the second oversampled received signal may comprise: generating a noise-free received signal without a frequency offset applied; applying an element-wise multiplication of the second oversampled received signal with a complex conjugate of the generated noise-free received signal to generate a new signal; and determining an aliased frequency offset within the determined set of possible aliased frequency offsets to be the true frequency offset, wherein the aliased frequency offset determined to be the true frequency offset is an aliased frequency offset within the determined set of possible aliased frequency offsets that is most similar to the generated new signal.

Figure 6:
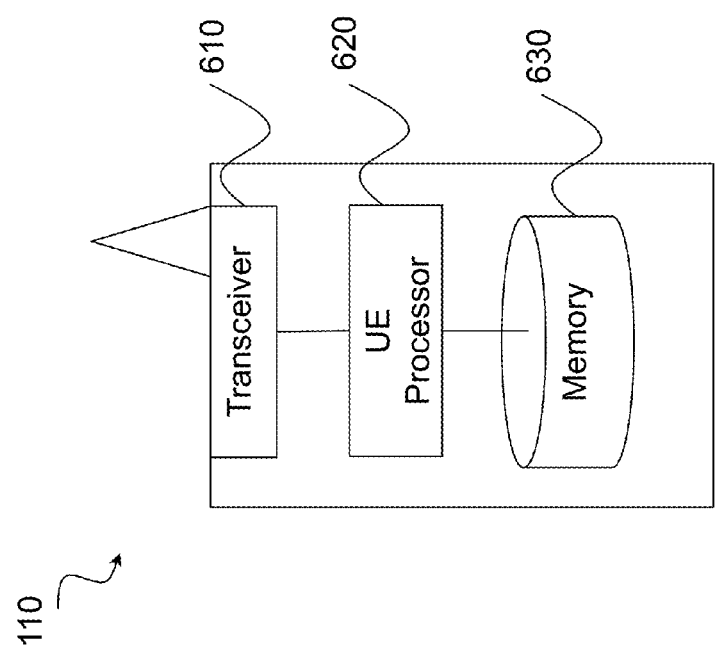
FIG. 6 is a schematic diagram of an exemplary wireless device, in accordance with certain embodiments.

FIG. 6 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 610, processor 620, and memory 630. In some embodiments, transceiver 610 facilitates transmitting wireless signals to and receiving wireless signals from network node 115 (e.g., via an antenna), processor 620 executes instructions to provide some or all of the functionality described above as being provided by wireless device 110, and memory 630 stores the instructions executed by processor 620.

Processor 620 may include any suitable combination of hardware and software implemented in one or more modules to execute instructions and manipulate data to perform some or all of the described functions of wireless device 110, such as the functions of wireless device 110 described above in relation to FIGS. 1-5. In some embodiments, processor 620 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 620.

Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 620. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
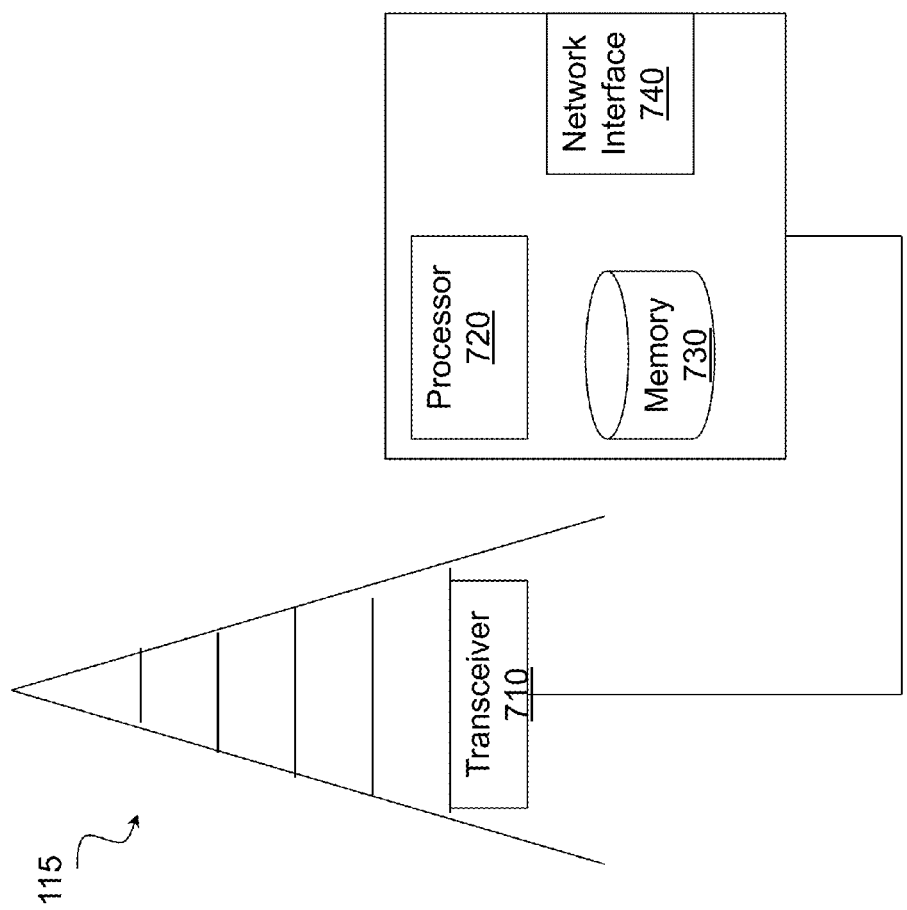
FIG. 7 is a schematic diagram of an exemplary network node, in accordance with certain embodiments.

FIG. 7 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processor 720, memory 730, and network interface 740. In some embodiments, transceiver 710 facilitates transmitting wireless signals to and receiving wireless signals from wireless device 110 (e.g., via an antenna), processor 720 executes instructions to provide some or all of the functionality described above as being provided by a network node 115, memory 730 stores the instructions executed by processor 720, and network interface 740 communicates signals to backend network components, such as a gateway, switch, router, Internet, Public Switched Telephone Network (PSTN), core network nodes or radio network controllers 130, etc.

Processor 720 may include any suitable combination of hardware and software implemented in one or more modules to execute instructions and manipulate data to perform some or all of the described functions of network node 115, such as those described above in relation to FIGS. 1-5 above. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
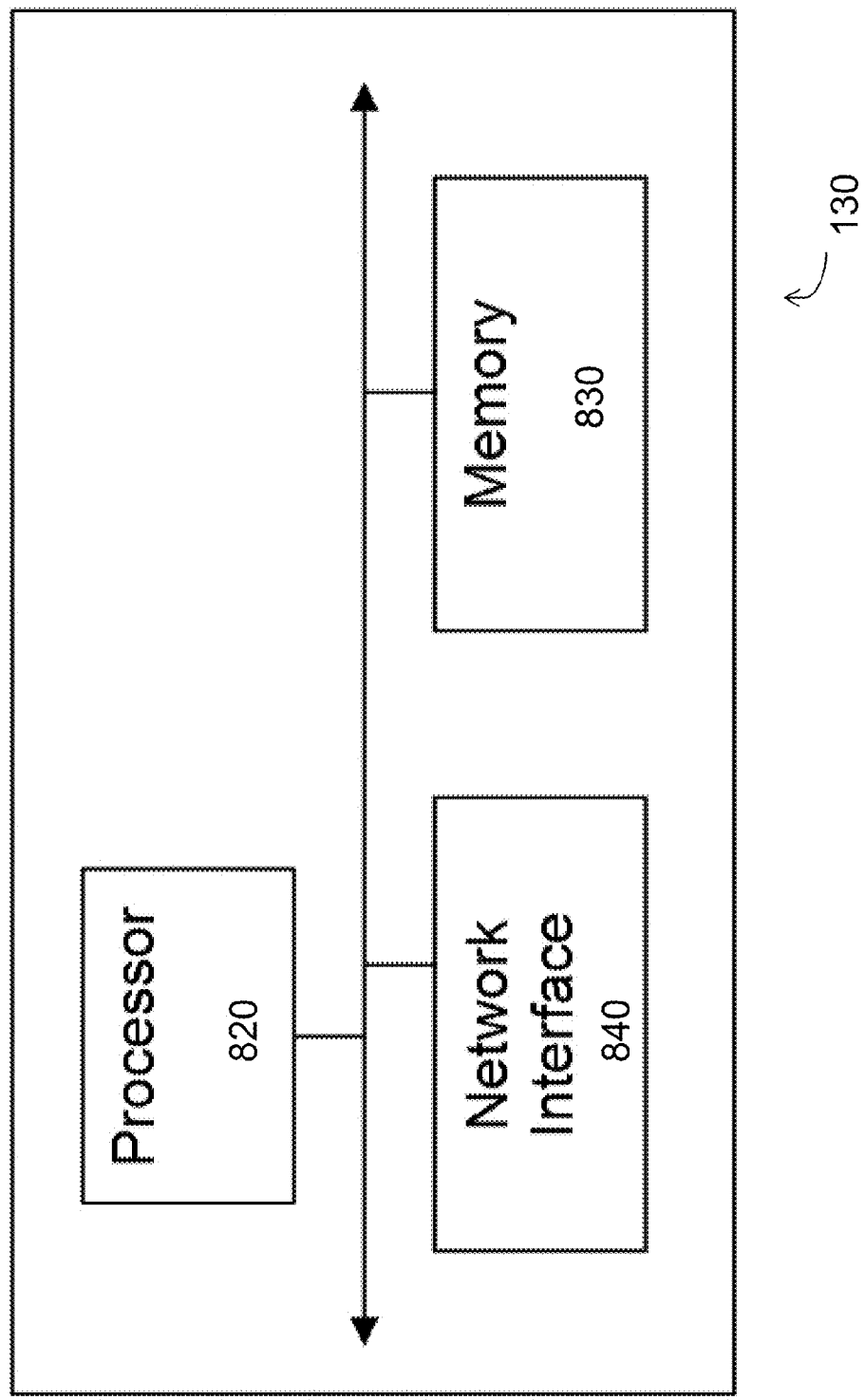
FIG. 8 is a schematic diagram of an exemplary radio network controller or core network node, in accordance with certain embodiments.

FIG. 8 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 115, radio network controllers or core network nodes 130, etc.

Processor 820 may include any suitable combination of hardware and software implemented in one or more modules to execute instructions and manipulate data to perform some or all of the described functions of the radio network controller or core network node 130. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Figure 9:
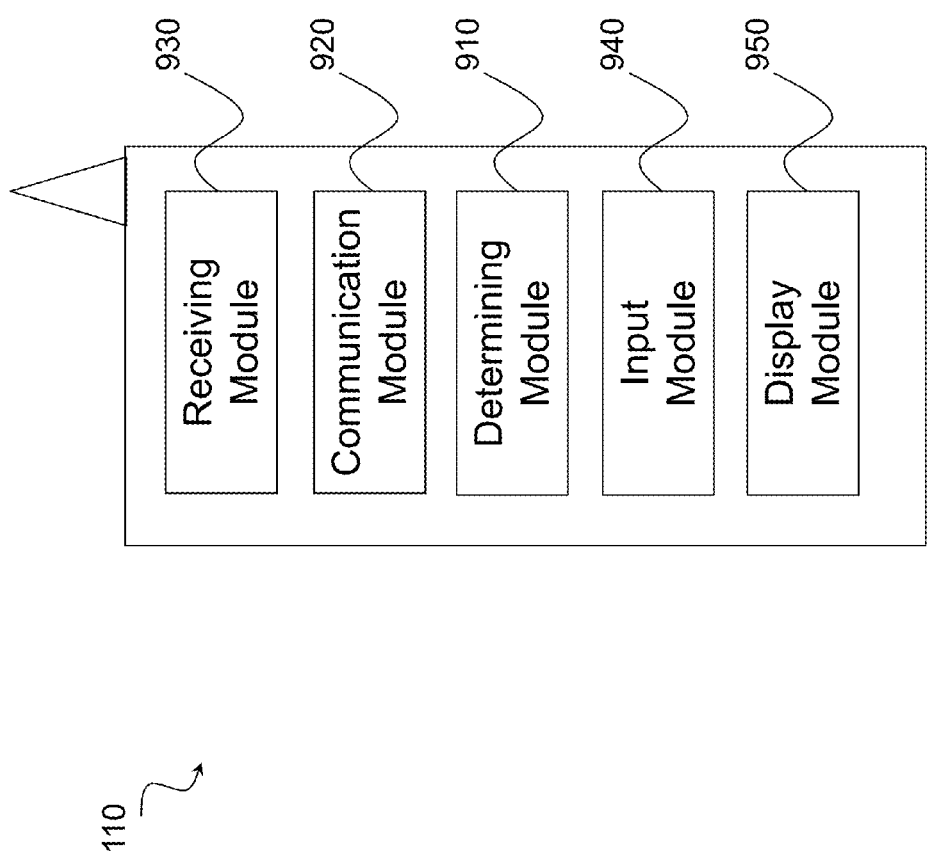
FIG. 9 is a schematic diagram of an exemplary wireless device, in accordance with certain embodiments.

FIG. 9 is a schematic block diagram of an exemplary wireless device, in accordance with certain embodiments. Wireless device 110 may include one or more modules. For example, wireless device 110 may include a determining module 910, a communication module 920, a receiver module 930, an input module 940, a display module 950, and any other suitable modules.

Determining module 910 may perform the processing functions of wireless device 110. For example, determining module 910 may obtain a first oversampled received signal by sampling the received signal according to a symbol rate, and estimate a first frequency offset based on the first oversampled received signal, the first frequency offset estimated using an estimation range limited to one of a bandwidth of the received signal or the symbol rate of the received signal. As another example, determining module 910 may obtain a second oversampled received signal by sampling the received signal according to N times the symbol rate, wherein N is greater than 1. As yet another example, determining module 910 may estimate a true frequency offset based on the first frequency offset estimate and the second oversampled received signal. Determining module 910 may include or be included in one or more processors, such as processor 620 described above in relation to FIG. 6. Determining module 910 may include analog and/or digital circuitry configured to perform any of the functions of determining module 910 and/or processor 720 described above. The functions of determining module 910 described above may, in certain embodiments, be performed in one or more distinct modules.

Communication module 920 may perform the transmission functions of wireless device 110. Communication module 920 may transmit messages to one or more of network nodes 115 of network 100. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910.

Receiving module 930 may perform the receiving functions of wireless device 110. For example, receiving module 930 may receive a signal. Receiving module 930 may include a receiver and/or a transceiver. Receiving module 930 may include circuitry configured to wirelessly receive messages and/or signals. In particular embodiments, receiving module 930 may communicate received messages and/or signals to determining module 910.

Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910.

Display module 950 may present signals on a display of wireless device 110. Display module 950 may include the display and/or any appropriate circuitry and hardware configured to present signals on the display. Display module 950 may receive signals to present on the display from determining module 910.

Determining module 910, communication module 920, receiving module 930, input module 940, and display module 950 may include any suitable configuration of hardware and/or software. Wireless device 110 may include additional modules beyond those shown in FIG. 9 that may be responsible for providing any suitable functionality, including any of the functionality described above and/or any additional functionality (including any functionality necessary to support the various solutions described herein).

Figure 10:
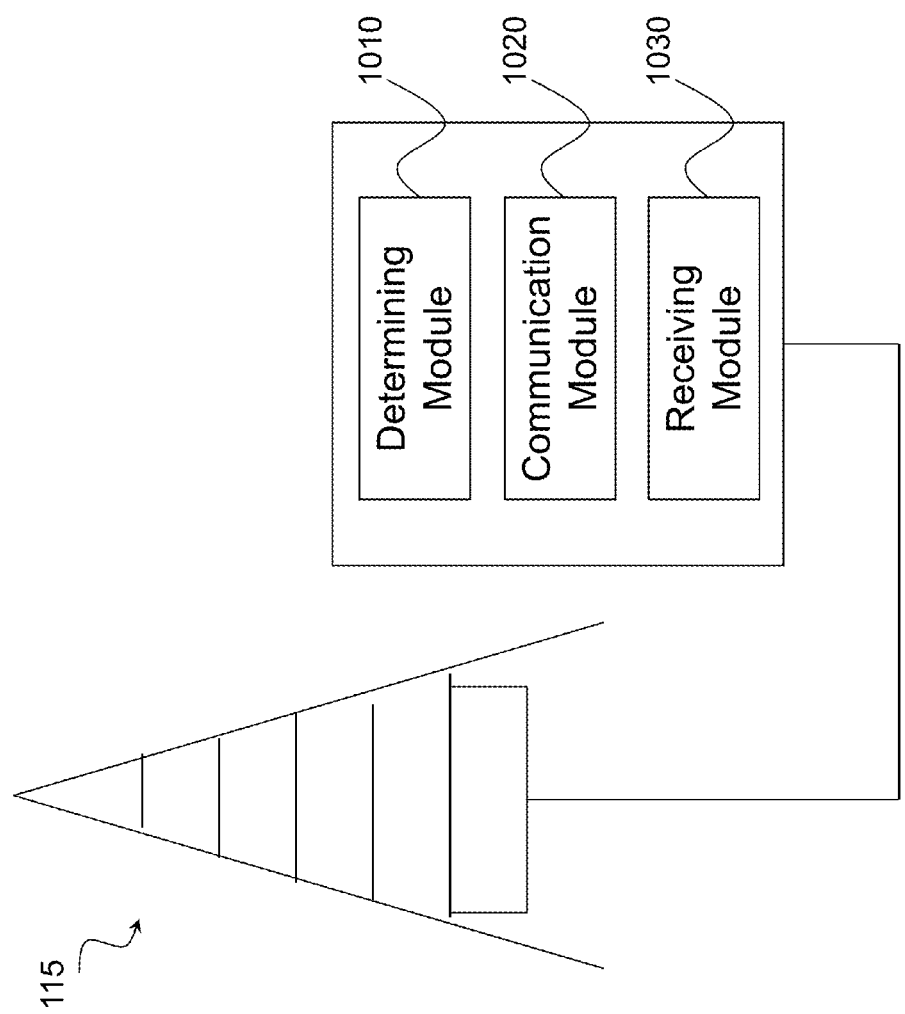
FIG. 10 is a schematic diagram of an exemplary network node, in accordance with certain embodiments.

FIG. 10 is a schematic block diagram of an exemplary network node 115, in accordance with certain embodiments. Network node 115 may include one or more modules. For example, network node 115 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 720 described above in relation to FIG. 7. In certain embodiments, the functions of two or more of the various modules may be combined into a single module.

Determining module 1010 may perform the processing functions of network node 115. As one example, determining module 1010 may obtain a first oversampled received signal by sampling the received signal according to a symbol rate, and estimate a first frequency offset based on the first oversampled received signal, the first frequency offset estimated using an estimation range limited to one of a bandwidth of the received signal or the symbol rate of the received signal. As another example, determining module 1010 may obtain a second oversampled received signal by sampling the received signal according to N times the symbol rate, wherein N is greater than 1. As yet another example, determining module 1010 may estimate a true frequency offset based on the first frequency offset estimate and the second oversampled received signal. Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 may, in certain embodiments, be performed in one or more distinct modules.

Communication module 1020 may perform the transmission functions of network node 115. Communication module 1020 may transmit messages to one or more of wireless devices 110. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010 or any other module.

Receiving module 1030 may perform the receiving functions of network node 115. As one example, receiving module 1030 may receive a signal. Receiving module 1030 may receive any suitable information from a wireless device. Receiving module 1030 may include a receiver and/or a transceiver. Receiving module 1030 may include circuitry configured to wirelessly receive messages and/or signals. In particular embodiments, receiving module 1030 may communicate received messages and/or signals to determining module 1010 or any other suitable module.

Determining module 1010, communication module 1020, and receiving module 1030 may include any suitable configuration of hardware and/or software. Network node 115 may include additional modules beyond those shown in FIG. 10 that may be responsible for providing any suitable functionality, including any of the functionality described above and/or any additional functionality (including any functionality necessary to support the various solutions described herein).

Figure 11:
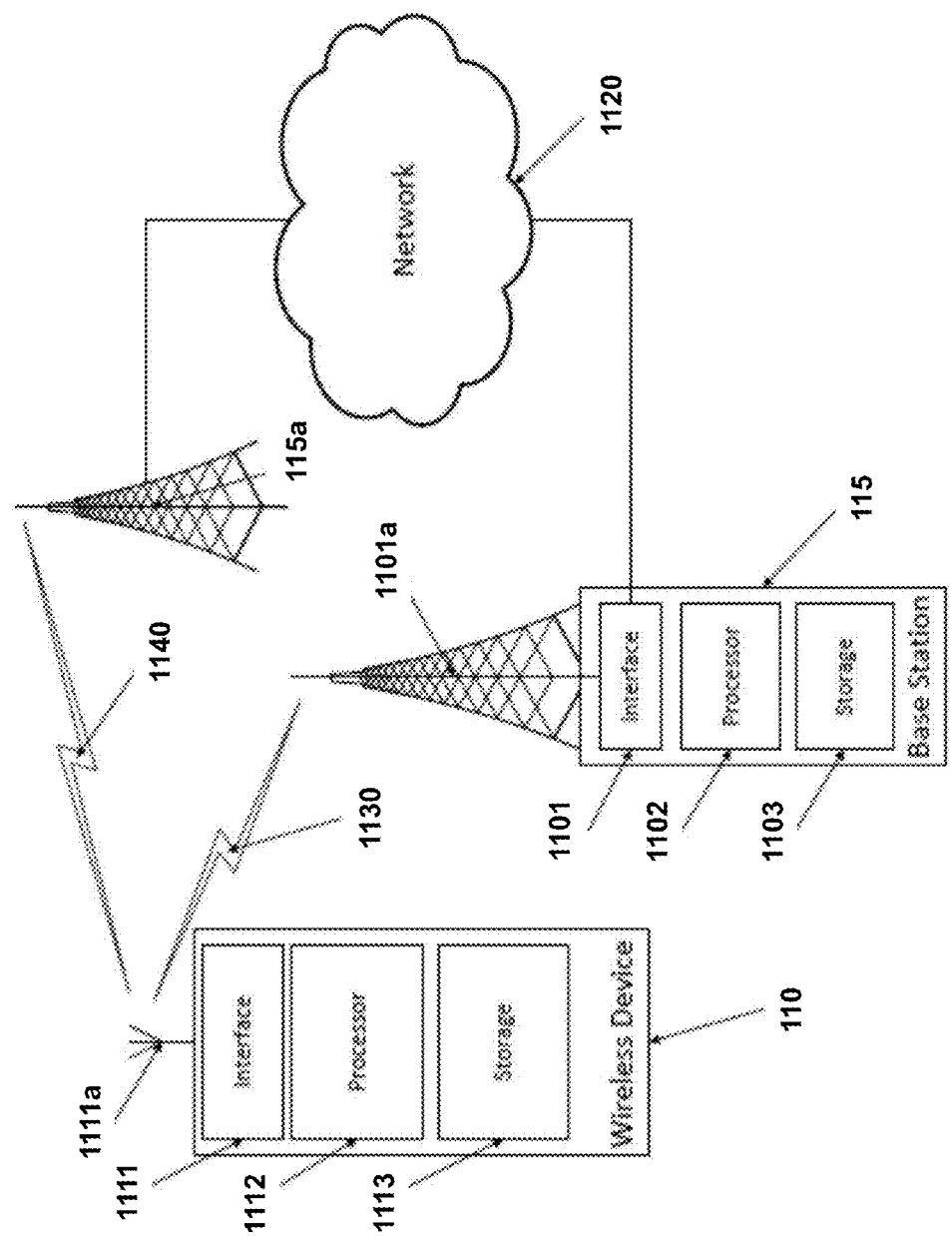
FIG. 11 is a block diagram illustrating an embodiment of a wireless communication network, in accordance with certain embodiments.

FIG. 11 is a block diagram illustrating an embodiment of a wireless communication network, in accordance with certain embodiments. More particularly, FIG. 11 illustrates a more detailed view of network node 115 and wireless device 110. For simplicity, FIG. 11 depicts network 1120, network nodes 115 and 115*a*, and wireless device 110. Network node 115 comprises processor 1102, storage 1103, interface 1101, and antenna 1101*a*. Similarly, wireless device 110 comprises processor 1112, storage 1113, interface 1111 and antenna 1111*a*. These components may work together in order to provide network node and/or wireless device functionality, such as providing wireless connections in a wireless network and correcting frequency offset in NB M2M. For example, wireless device 110 (including processor 1112, storage 1113, interface 1111, and antenna 1111*a*) and network nodes 115 and/or 115*a* (including processor 1102, storage 1103, interface 1101, and antenna 1101*a*) may perform some or all of the described functions of wireless device 110 and network node 115 described above in relation to FIGS. 1-5. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 1120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 115 comprises processor 1102, storage 1103, interface 1101, and antenna 1101*a*. These components are depicted as single boxes located within a single larger box. In practice however, network node 115 may comprise multiple different physical components that make up a single illustrated component (e.g., interface 1101 may comprise terminals for coupling wires for a wired connection and a radio transceiver for a wireless connection). Similarly, network node 115 may be composed of multiple physically separate components (e.g., a NodeB component and a RNC component, a BTS component and a BSC component, etc.), which may each have their own respective processor, storage, and interface components. In certain scenarios in which network node 115 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 115 may be configured to support multiple radio access technologies (RATs). In such embodiments, some components may be duplicated (e.g., separate storage 1103 for the different RATs) and some components may be reused (e.g., the same antenna 1101*a* may be shared by the RATs).

Processor 1102 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115 components, such as storage 1103, network node 115 functionality. For example, processor 1102 may execute instructions stored in storage 1103. Such functionality may include providing various wireless features discussed herein to a wireless devices, such as wireless device 110, including any of the features or benefits disclosed herein.

Storage 1103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1103 may store any suitable instructions, data or information, including software and encoded logic, utilized by network node 115. Storage 1103 may be used to store any calculations made by processor 1102 and/or any data received via interface 1101.

Network node 115 also comprises interface 1101 which may be used in the wired or wireless communication of signaling and/or data between network node 115, network 1120, and/or wireless device 110. For example, interface 1101 may perform any formatting, coding, or translating that may be needed to allow network node 115 to send and receive data from network 1120 over a wired connection. Interface 1101 may also include a radio transmitter and/or receiver that may be coupled to or a part of antenna 1101a. The radio may receive digital data that is to be sent out to other network nodes or wireless devices via a wireless connection. The radio may convert the digital data into a radio signal having the appropriate channel and bandwidth parameters. The radio signal may then be transmitted via antenna 1101a to the appropriate recipient (e.g., wireless device 110).

Antenna 1101a may be any type of antenna capable of transmitting and receiving data and/or signals wirelessly. In some embodiments, antenna 1101a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 115 and/or other wireless devices. Wireless device 110 comprises processor 1112, storage 1113, interface 1111, and antenna 1111a. Like network node 115, the components of wireless device 110 are depicted as single boxes located within a single larger box, however in practice a wireless device may comprises multiple different physical components that make up a single illustrated component (e.g., storage 1113 may comprise multiple discrete microchips, each microchip representing a portion of the total storage capacity).

Processor 1112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as storage 1113, wireless device 110 functionality. Such functionality may include providing various wireless features discussed herein, including any of the features or benefits disclosed herein.

Storage 1113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 1113 may store any suitable data, instructions, or information, including software and encoded logic, utilized by wireless device 110. Storage 1113 may be used to store any calculations made by processor 1112 and/or any data received via interface 1111.

Interface 1111 may be used in the wireless communication of signaling and/or data between wireless device 110 and network node 115. For example, interface 1111 may perform any formatting, coding, or translating that may be needed to allow wireless device 110 to send and receive data from network node 115 over a wireless connection. Interface 1111 may also include a radio transmitter and/or receiver that may be coupled to or a part of antenna 1111a. The radio may receive digital data that is to be sent out to network node 115 via a wireless connection. The radio may convert the digital data into a radio signal having the appropriate channel and bandwidth parameters. The radio signal may then be transmitted via antenna 1111a to network node 115.

Antenna 1111a may be any type of antenna capable of transmitting and receiving data and/or signals wirelessly. In some embodiments, antenna 1111a may comprise one or more omni-directional, sector or panel antennas operable to transmit/receive radio signals between 2 GHz and 66 GHz. For simplicity, antenna 1111a may be considered a part of interface 1111 to the extent that a wireless signal is being used.

In some embodiments, the components described above may be used to implement one or more functional modules used in narrowband mobile-to-mobile cell search. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 1112 and/or 1102, possibly in cooperation with storage 1113 and/or 1103. Processors 1112 and/or 1102 and storage 1113 and/or 1103 may thus be arranged to allow processors 1112 and/or 1102 to fetch instructions from storage 1113 and/or 1103 and execute the fetched instructions to allow the respective functional module to perform any features or functions disclosed herein. The modules may further be configured to perform other functions or steps not explicitly described herein but which would be within the knowledge of a person skilled in the art.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
BIB Broadcast Information Block
EDGE Enhanced Data Rates for GSM Evolution
FDM Frequency Division Multiplexing
FIIS Frame Index Indication Sequence
GERAN GSM EDGE Radio Access Network
GSM Global System for Mobile Communications
Hz Hertz
kHz kilo Hertz
MHz Mega Hertz
MTC Machine Type Communications
NB M2M Narrowband Machine to Machine
PBSCH Physical Broadcast Synchronization Channel PSS Primary Synchronization Sequence
RC Raised Cosine
RRC Root Raised Cosine
SSS Secondary Synchronization Sequence

The invention claimed is:

1. A method in a node, comprising:
receiving a signal;
obtaining a first oversampled received signal by sampling the received signal according to a symbol rate;
estimating a first frequency offset based on the first oversampled received signal, the first frequency offset estimated using an estimation range limited to one of a bandwidth of the received signal or the symbol rate of the received signal;
obtaining a second oversampled received signal by sampling the received signal according to N times the symbol rate, wherein N is greater than 1;
estimating a true frequency offset based on the first frequency offset estimate and the second oversampled received signal; and
determining, based on the estimated first frequency offset, a set of possible aliased frequency offsets corresponding to the estimated first frequency offset;
wherein estimating the true frequency offset based on the first frequency offset estimate and the second oversampled received signal comprises:
generating a plurality of signals, each of the plurality of generated signals comprising a noise-free received signal with a frequency offset applied, the applied frequency offset comprising one of the determined set of possible aliased frequency offsets corresponding to the estimated first frequency offset;
comparing one or more of the generated signals to the second oversampled received signal; and
determining one of the applied frequency offsets to be the true frequency offset based at least in part on the comparison of one or more of the generated signals to the second oversampled received signal.

2. The method of claim 1, wherein the node comprises one of a wireless device or a network node.

3. The method of claim 1, wherein estimating the true frequency offset based on the first frequency offset estimate and the second oversampled received signal comprises:
correcting the estimated first frequency offset using the second oversampled received signal to extend the estimation range outside of the signal bandwidth of the received signal or the symbol rate of the received signal.

4. The method of claim 1, further comprising estimating a time offset before estimating the first frequency offset as part of a cell search procedure.

5. The method of claim 1, further comprising using the estimated true frequency offset to correct the received signal to enable reception of subsequent information.

6. The method of claim 5, wherein the subsequent information comprises one or more of:
a cell identity;
a frame number;
broadcast information; and
a data transmission.

7. A node, comprising:
one or more processors, the one or more processors configured to:
receive a signal;
obtain a first oversampled received signal by sampling the received signal according to a symbol rate;
estimate a first frequency offset based on the first oversampled received signal, the first frequency offset estimated using an estimation range limited to one of a bandwidth of the received signal or the symbol rate of the received signal;
obtain a second oversampled received signal by sampling the received signal according to N times the symbol rate, wherein N is greater than 1;
estimate a true frequency offset based on the first frequency offset estimate and the second oversampled received signal;
determine, based on the estimated first frequency offset, a set of possible aliased frequency offsets corresponding to the estimated first frequency offset;
generate a plurality of signals, each of the plurality of generated signals comprising a noise-free received signal with a frequency offset applied, the applied frequency offset comprising one of the determined set of possible aliased frequency offsets corresponding to the estimated first frequency offset;
compare one or more of the generated signals to the second oversampled received signal; and
determine one of the applied frequency offsets to be the true frequency offset based at least in part on the comparison of one or more of the generated signals to the second oversampled received signal.

8. The node of claim 7, wherein the node comprises one of a wireless device or a network node.

9. The node of claim 7, wherein the one or more processors are further configured to:
correct the estimated first frequency offset using the second oversampled received signal to extend the estimation range outside of the signal bandwidth of the received signal or the symbol rate of the received signal.

10. The node of claim 7, wherein the one or more processors are further configured to estimate a time offset before estimating the first frequency offset as part of a cell search procedure.

11. The node of claim 7, wherein the one or more processors are further configured to use the estimated true frequency offset to correct the received signal to enable reception of subsequent information.

12. The node of claim 11, wherein the subsequent information comprises one or more of:
a cell identity;
a frame number;
broadcast information; and
a data transmission.

13. A computer program product comprising instructions stored on non-transitory computer-readable media which, when executed by one or more processors, perform the acts of:
receiving a signal;
obtaining a first oversampled received signal by sampling the received signal according to a symbol rate;
estimating a first frequency offset based on the first oversampled received signal, the first frequency offset estimated using an estimation range limited to one of a bandwidth of the received signal or the symbol rate of the received signal;
obtaining a second oversampled received signal by sampling the received signal according to N times the symbol rate, wherein N is greater than 1;
estimating a true frequency offset based on the first frequency offset estimate and the second oversampled received signal; and determining, based on the estimated first frequency offset, a set of possible aliased frequency offsets corresponding to the estimated first frequency offset;

wherein the act of estimating the true frequency offset based on the first frequency offset estimate and the second oversampled received signal comprises:

generating a plurality of signals, each of the plurality of generated signals comprising a noise-free received signal with a frequency offset applied, the applied frequency offset comprising one of the determined set of possible aliased frequency offsets corresponding to the estimated first frequency offset;

comparing one or more of the generated signals to the second oversampled received signal; and determining one of the applied frequency offsets to be the true frequency offset based at least in part on the comparison of one or more of the generated signals to the second oversampled received signal.

14. The computer program product of claim 13, wherein the act of estimating the true frequency offset based on the first frequency offset estimate and the second oversampled received signal comprises:

correcting the estimated first frequency offset using the second oversampled received signal to extend the estimation range outside of the signal bandwidth of the received signal or the symbol rate of the received signal.

15. The computer program product of claim 13, wherein the computer program product further comprises instructions which, when executed by the one or more processors, perform the act of:

estimating a time offset before estimating the first frequency offset as part of a cell search procedure.

16. The computer program product of any of claim 13, wherein the computer program product further comprises instructions which, when executed by the one or more processors, perform the act of:

using the estimated true frequency offset to correct the received signal to enable reception of subsequent information, the subsequent information comprising one or more of:

a cell identity;

a frame number;

broadcast information; and a data transmission.

\* \* \* \* \*